(No Model.)

C. M. PLATT.
BUTTON FASTENER.

No. 388,443. Patented Aug. 28, 1888.

Witnesses.
Fred. S. Greenleaf.
Francis L. Emery.

Inventor.
Clark M. Platt
by Crosby & Gregory.
Attys.

UNITED STATES PATENT OFFICE.

CLARK M. PLATT, OF WATERBURY, CONNECTICUT.

BUTTON-FASTENER.

SPECIFICATION forming part of Letters Patent No. 388,443, dated August 28, 1888.

Application filed March 1, 1888. Serial No. 265,782. (No model.)

*To all whom it may concern:*

Be it known that I, CLARK M. PLATT, of Waterbury, in the county of New Haven and State of Connecticut, have invented an Improvement in Rivets, of which the following description, in connection with the accompanying drawings, is a specification, like letters on the drawings representing like parts.

Prior to my invention buttons have ordinarily been attached to fabrics by rivets having two or more independent pointed prongs; but such rivets for some classes of work are objectionable, because when upset fail to present a smooth unbroken surface.

This invention has for its object to construct a rivet for attaching buttons and the like, which consists, essentially, of a rivet having a head or flange and a shank, the latter presenting an unslotted end and having variably-reduced longitudinal grooves therein between its head and entering end, so as to be easily crushed or upset without expanding that part of the shank nearest or next to the head or flange.

In carrying out my present invention a tubular rivet is preferably employed, and the shank of the rivet next the unslotted end is grooved at intervals or variably reduced in thickness, such grooves extending longitudinally, the material of the shank being thereby removed either partially or entirely through it, and presenting several narrow webs between the unslotted end of the shank and that end nearest the head or flange. This construction enables the shank to be easily upset, and while expanding the unslotted end remains intact.

Figure 1:
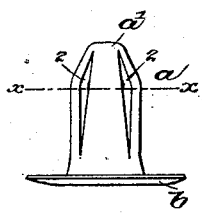
Figure 2:
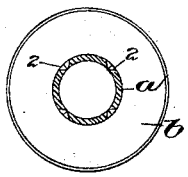
Figure 3:
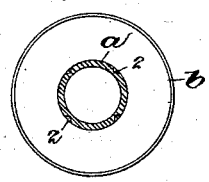
Figure 4:
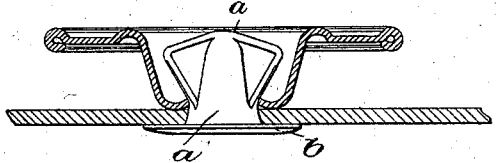
Figure 5:
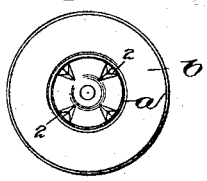

Figure 1 shows in side elevation a tubular rivet embodying this invention; Fig. 2, a horizontal section of the rivet shown in Fig. 1, taken on the dotted line $x\,x$; Fig. 3, a similar section of the rivet, the grooves extending but partially through the shank; Fig. 4, a side elevation of a rivet inserted through the material and into a button and partially crushed or upset; Fig. 5, a top view of the rivet shown in Fig. 1, the shank being open at each end; and Figs. 6 and 7 show solid rivets grooved longitudinally in accordance with this invention.

The rivet is composed of the hollow or tubular shank $a$, having the unslotted end $a'$ and flanged head $b$, made in any usual or suitable manner. The shank near the unslotted end $a'$ is variably weakened or reduced, as by several longitudinal grooves, 2, (four being herein shown,) made by removing the material of the shank to any depth desired, either entirely through it, as in Fig. 2, or partially through it, as in Fig. 3. By this means the shank near the unslotted end is materially weakened, and several webs are presented joined at each end, which upon being passed through the opening in a button and crushed or upset expand radially, as in Fig. 4, while the neck, or that end of the shank nearest the head $b$, retains its normal form, so as not to bind against the button.

Figure 6:
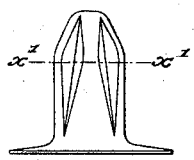
Figure 7:
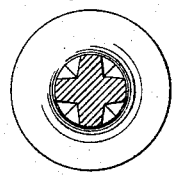

In Fig. 5 I have shown the shank as open at each end, such form of rivet being common, and in Figs. 6 and 7 I have shown a common form of solid rivet the shank of which is weakened in accordance with this invention.

I claim—

1. A rivet having a head and a shank having variably-reduced grooves extended longitudinally for a portion of the distance between its head and its entering end or point, as and for the purpose described.

2. A tubular rivet having a head and shank grooved longitudinally part way between its head and its entering end or point to weaken it, substantially as described.

In testimony whereof I have signed my name to this specification in the presence of two subscribing witnesses.

CLARK M. PLATT.

Witnesses:
LUCIEN F. BURPEE,
JOHN P. KELLOGG.